April 22, 1969  W. V. SMITH  3,439,975
OPTICAL CAVITY ELECTRO-OPTIC SCANNING DEVICE
Filed March 8, 1965
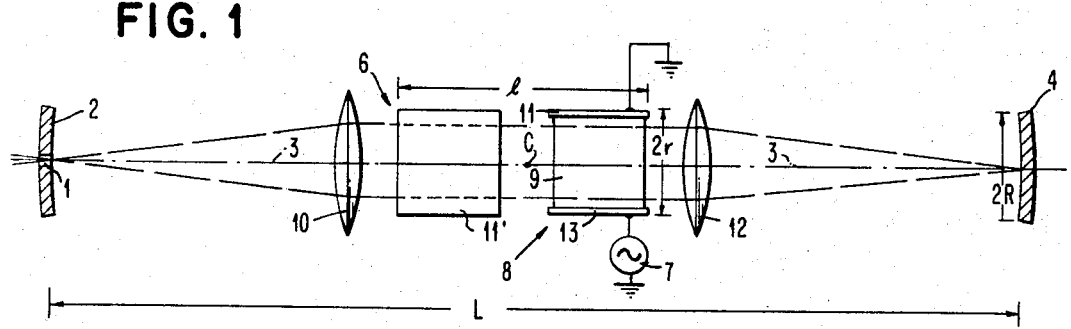
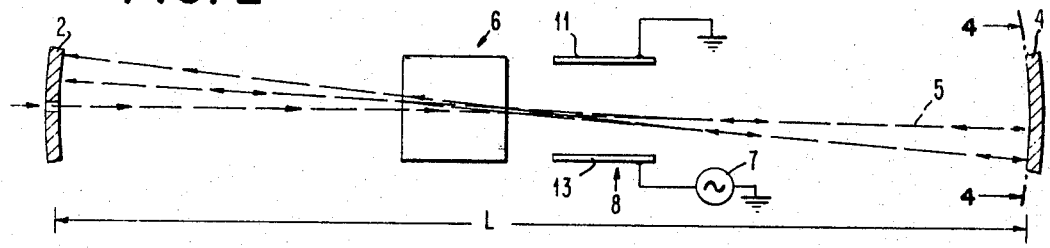
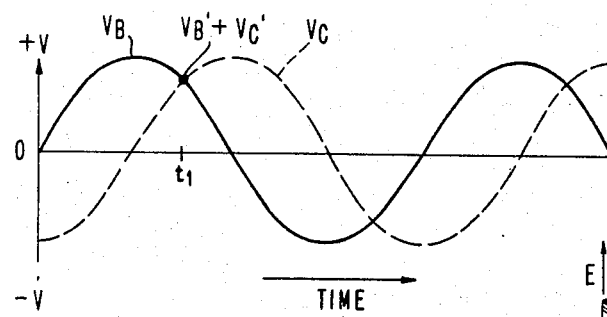
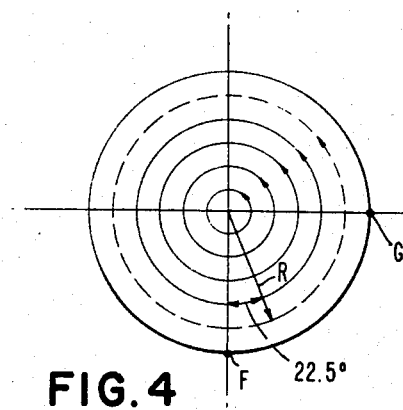
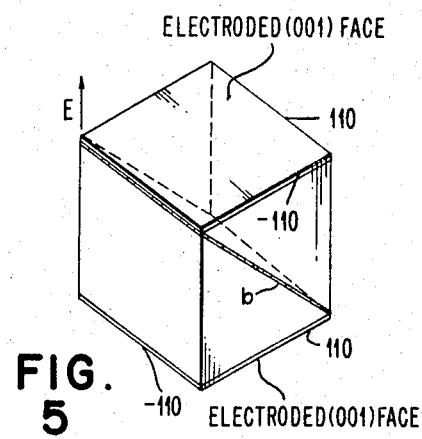
INVENTOR.
WILLIAM V. SMITH
BY
ATTORNEY

United States Patent Office 3,439,975
Patented Apr. 22, 1969

3,439,975
OPTICAL CAVITY ELECTRO-OPTIC SCANNING DEVICE
William V. Smith, Chappaqua, N.Y., assignor to International Business Machines Corporation, Armonk, N.Y., a corporation of New York
Filed Mar. 8, 1965, Ser. No. 437,753
Int. Cl. G02f 1/26, 1/34
U.S. Cl. 350—150                                    7 Claims

ABSTRACT OF THE DISCLOSURE

A system for obtaining a scanning beam of light that employs two electro-optical deflectors on opposite sides of the center of a confocal cavity. A beam of light is made to enter the axis of said cavity through a hole in one mirror. By causing a reversal of voltage to be applied to each deflector in synchronism with the time delay between successive passes of light through such deflectors, the amount of deflection is multiplied in accordance with the number of reflections within the cavity.

---

This invention relates to electro-optical systems, but more particularly to a scanning system that attains a revolving spot of light.

In many logic-solving, data handling, or communication systems, it is desirable to obtain a high speed scanner. When the scanning means is a beam of light, one often has to rely on expensive prisms and intricate electromechanical devices to attain the scan. Electromechanical features tend to limit the scanning speed and accurately cut prisms are expensive.

The invention disclosed herein provides a high speed scanner by combining two linear electro-optical deflection units within an optical cavity. Two spherical mirrors are separated by a predetermined distance, which distance also determines their equal radii of curvature. Placed symmetrically about, and as near as possible to, the common center of the two mirrors are two linear electro-optical units, or the like, which serve to orthogonally deflect any light entering the optical cavity along the central axis of the two mirrors through a hole in one of the mirrors. Voltages are applied to the deflection units so as to deflect light in a downward as well as in a lateral direction. The deflected light will impinge upon the second mirror and be reflected toward the deflection units. Alternating voltage that is applied to the deflection units has a frequency such that a 180° out of phase voltage is applied to the deflecting units when the reflected deflected wave from the second mirror arrives thereat. Such out of phase voltage causes further deflection of the original light beam away from the central axis, before impinging upon the first mirror. Such reflections and deflections occur, arriving at the mirrors further removed from the central axis, until a circular beam of light "walks off" from the edge of one of the mirrors.

Thus it is an object of this invention to provide a high speed scanning device.

Another object is to employ an optical cavity as an aid in obtaining such high speed scanning device.

Yet another object is to obtain a scanning device employing a minimum of electromechanical elements.

The foregoing and other objects, features and advantatges of the invention will be apparent from the following more particular description of a preferred embodiment of the invention is illustrated in the accompanying drawing.

In the drawing:

FIGURE 1 is a schematic embodiment of the invention.

FIGURE 2 is a showing of the invention employing principle light rays.

FIGURE 3 is a voltage-time diagram of the potentials applied to the linear electro-optical units employed in the present invention.

FIGURE 4 is a view of the patterns of light looking into mirror 4 of FIGURE 2.

FIGURE 5 is an example of an electro-optical unit employed in the present invention.

As is seen in FIGURE 1, a pair of spherical mirrors 2 and 4, having central axis 3, comprise an optical cavity for light entering an opening 1 in mirror 2. Symmetrically disposed on either side of the geometric center $c$ of the optical cavity are deflection units 6 and 8 rotated 90° with respect to each other. Such deflecting units are composed of a crystal 9 of, for example, zinc sulphide (ZnS) or cuprous chloride (CuCl) that have square cross-sections. These crystals have the property that an electric field E applied along one cubic crystal axis (say 001) induces a change $\Delta n$ in refractive index for light travelling in the 110 direction but polarized along $-110$. The same field E induces an opposite change $-\Delta n$, for light travelling in the $-110$ direction but polarized along 110. If two cubes of this material are prepared bounded by 001, 110 and $-110$ planes, such cubes may be electroded on the 001 faces. One cube is sawed long a diagonal in the 110 plane and the other along a diagonal in the $-110$ plane. Reassembling these cut cubes now, each with one piece from each of the original cubes, cemented along their sawed faces results in an electro-optic biprism as shown in FIGURE 5. It is seen that light travelling along 110 and polarized along $-110$ in the bottom prism travels along $-110$ and is polarized along 110 in the upper prism. Consequently it sees a refractive index change $2\Delta n$ at the diagonal boundary $b$ and is deflected in the vertical plane. A reversal of the field E reverses $2\Delta n$ and reverses the deflection. While for simplicity the deflecting units have been described as cubes, a similar construction allows one to fabricate units of square cross-section over the face perpendicular to the light, but of a different dimension, $l/2$, along the light paths. It is understood that other linear electro-optical crystals can be employed as deflecting units, requiring different orientations of the axes of said crystals with respect to the polarized light entering along axis 3 of FIGURE 1, without departing from the teaching of this invention. On each side of the deflecting units 6 and 8 are lenses 10 and 12. Lens 10 collimates light entering opening 1 through units 6 and 8 and lens 12 refocuses the light onto mirror 4. The role of lenses 10 and 12 are reversed when light from mirror 4 travels toward units 6 and 8. The effective aperture of each mirror 2 and 4 is $2R$ wherein both mirrors are separated by a distance L. The deflecting elements formed by units 6 and 8 have a total length $l$ and the apertures of lenses 10 and 12 are $2r$, where $r$ is substantially equal to or slightly less than the value R. An A.C. source 7 is applied to the electrodes 11 and 13 that form part of the electro-optic deflecting unit. A similar source of electrical potential, not shown, is applied to the electrodes of electro-optical unit 6.

The scanner operates in the following manner. The respective voltages on the electro-optical deflectors 6 and 8 are represented by the voltage-time plot shown in FIGURE 3. The curve marked $V_B$ is a plot of the voltages applied to the electrodes of the deflection unit 6. In the absence of any other potentials, the presence of the sinusoidal voltage $V_B$ on unit 6 alone would result in amplitude modulation of the continuous light beam that enters the optical cavity through opening 1 in mirror 2. Such amplitude modulation, after successive passes of reflected rays through unit 6, would result in a deflection of the initial ray that entered along axis 3, such deflection continuing until the ray of light escaped beyond the edge of one of the mirrors 2 or 4. As seen in FIGURE 4, point F represents the escape of modulated light when only cell 6 is operative to deflect the ray of light entering aperture 1.

The second electro-optical device 8 has a second sinusoidal voltage $V_C$ (shown as dotted line $V_C$ in FIGURE 3) applied to its electrodes 11 and 13, which voltage occurs so that its modulating effect on a beam of light in the optical cavity is a quarter of a wavelength out of phase with the frequency of $V_B$. The electro-optical unit 8 causes a deflection of a light ray passing through it which is orthogonal to the deflection given to such light ray by unit 6. The effect of unit 8, with the modulating voltage $V_C$ applied to its electrodes, is to deflect the light ray in a plane perpendicular to the drawing. The deflection produced by cell 8 alone will cause the light rays passing through it to be deflected at a point G lying beyond the rim of either mirror 2 or 4. At some point in time, namely, $t_1$, the vector combination of deflection at any point due to the combined action of voltages $V'_B$ and $V'_C$ results in an overall radial deflection at an intermediate angle along the rim of mirror 2 or 4. In the example shown in FIGURE 3, at time $t_1$, the amount of deflection of light entering the aperture 1 in mirror 2 would be 22.5°. The circles of increasing radii shown in FIGURE 4 represent the consecutive deflections of light caused by the electro-optical devices 6 and 8 as reflected light passes through them. It is noted that the scanning beam of light increases in radius until said beam of light goes beyond the extremities of either mirror 2 or 4. The dotted circle indicates the effective aperture; the diameter of such dotted circle is 2R.

In the example shown, the voltages $V_B$ and $V_C$ are each of equal amplitude and of equal frequency and the phase is a quarter wavelength apart. Thus a circle of light is ultimately produced at the rim of one of the mirrors 2 or 4. By changing the amplitudes and phases of voltages $V_B$ and $V_C$, one may obtain an elliptical scan of light or other geometric patterns. If one calculates the number of resolvable spots that can be obtained in the scanning beam, the relationship $N=2\pi(R/L\alpha\theta)$ is obtained, where N equals the number of resolvable spots, 2R is the aperture of the spherical confocal arrangement of mirrors, L is the distance between the mirrors 2 and 4, and $\alpha\theta$ is the angular deflection of the light ray from the axis 3 of the optical system. Since $\alpha\theta$ approximates $\lambda/2R$, N approximates $4\pi R^2/L\lambda$. Assuming that the electro-optical devices 6 and 8 have an index of refraction $n$, the single pass angular deflection $\Delta\theta$ of the combined units 6 and 8 equals $\Delta n \times l/R$, where $l$ equals the distance that the light ray must pass through the electro-optical elements 6 and 8.

The dimensions $l$ and R must be chosen consistent with the resolution sought concerning the number of resolvable spots that appear in the scanning system. In general, the order of magnitude of resolvable spots N equals $L/l$. However, deflection is small if $l$ is made too small. By the same token, if $l$ is made much smaller than R, then the electrodes of the electro-optical elements 6 and 8 must be separated widely compared to their combined lengths $l$, resulting in weak deflection of rays of light passing through them. A workable set of parameters is the following: Assume that the number of reflections M in the cavity before walk off from the mirrors takes place is 50. Note that for the walk off deflection conditions, $R^2$ equals $M\Delta n \times l \times L$, where $\Delta n$ is the change in the index of refraction of the crystal forming the crystal of an electro-optical device when light passes through it. Using the relationships $N \approx 4\pi R^2/L\lambda$ and $N=4l$, one obtains the relationship $N^2 \approx 4\pi R^2/l\lambda$. Since, for deflection conditions in the optical cavity, $R^2 \approx M\Delta n l L$, then $$N^2 \approx 4\pi M \Delta n l/\lambda$$

Using a value of M (the number of reflections within the cavity before walk off) as 50, $\Delta n = 2 \times 10^{-4}$ and $$\lambda = 5 \times 10^{-5} \text{ cm.}$$

$N^2 = 4\pi(50)(2 \times 10^{-4})L/5 \times 10^{-5}$ or $N^2 \approx 2500L$ or $N \approx 50\sqrt{L}$. For a mirror separation L of 100 cm., N, the number of resolvable spots, is 500. Since $R^2 \approx NL\lambda/4\pi$, substituting values for the variable yields $$R^2 \approx 500 \times 100 \times 5 \times 10^{-5}/4\pi$$

$\approx 0.2$ cm.$^2$; then $R \approx 0.45$ cm. Since $N=L/l$, $$l = 100 \text{ cm.}/500 = 0.2 \text{ cm.}$$

The above parameters are not meant to limit the invention, but merely indicate that an optical cavity having two confocal spherical mirrors of an effective aperture of 2R or 0.4 cm., separated by 100 cm., and employing two electro-optical elements whose combined optical path is 0.2 cm., will produce a scanning circle of light slightly more than 0.4 cm. in diameter. Slight variations will occur when different frequencies of light are used and crystals having different indices of refraction compose the electro-optical units 6 and 8. Moreover, when voltages are being applied to such units 6 and 8, the frequency ($f$) of the alternating voltages is so chosen that $T=2L/c$, $c$ being the velocity of light. The value T establishes the time at which the phase reversal of the voltage takes place at the electro-optical deflectors 6 and 8 so as to deflect a beam of light that has been reflected from one of the mirrors 2 or 4. Since L=100 cm., $T=2 \times 100$ cm./$3 \times 10^{10}$ cm./sec.$=2/3 \times 10^{-8}$ sec.

$$f = 1/T = 3/2 \times 10^8 = 150$$

megacycles in the example shown in explaining the operation of the present invention.

The employment of an electro-optical scanner in combination with an optical cavity results in a high speed scanner that has low diffraction losses. Moreover, the exploitation of repeated reflections in an optical cavity permits one to obtain greater angles of deflection for a given effective aperture of the electro-optical devices employed, decreasing the overall size of optical scanners.

While the invention has been particularly shown and described with reference to a preferred embodiment thereof, it will be understood by those skilled in the art that various changes in form and details may be made therein without departing from the spirit and scope of the invention.

What is claimed is:

1. An optical cavity comprising two spherical mirrors having equal radii of curvature, means for entering light along the central axis of said optical cavity, and electro-optical deflecting means on said axis at the center of said optical cavity for applying deflections to said light as the latter traverses said deflecting means after alternate reflections from said mirrors.

2. An optical cavity comprising two spherical mirrors, means for entering light along the central axis of said optical cavity, linear electro-optical deflecting means on said axis at the center of said optical cavity for applying deflections to said light as the latter traverses said deflecting means after alternate reflections from said mirrors.

3. An optical cavity comprising two spherical mirrors, means for entering light along the central axis of said optical cavity, linear electro-optical deflecting means on said axis at the center of said optical cavity and in the path of said light, means for applying orthogonal modulating frequencies to said deflecting means at predetermined intervals during alternate traverses of reflected light through said deflecting means whereby a scanning beam of light is produced off the edge of one of said mirrors.

4. A scanning device comprising two spherical mirrors, means for entering light along the central axis of said optical cavity, a pair of electro-optical deflecting means on said central axis and lying in the path of said light, said pair of electro-optical deflecting means being oriented so that the electro-optical effect of one is orthogonal to the effect of the other, means for applying substantially equal sinusoidal voltages a quarter wavelength apart to said pair of electro-optical deflecting means, so as to create a scan of said light as the latter is alternately deflected by said deflecting means and alternately reflected by said mirrors.

5. A scanning device comprising two spherical mirrors forming an optical cavity having a central axis, means for entering light into said cavity along said central axis, electro-optical deflecting means for continuously applying two orthogonal deflecting forces to said deflecting means so as to cause scanning of said light beam, said scanned light beam being reflected by a mirror in said cavity towards said deflecting means so as to be further deflected by said deflecting means, said deflections and reflections continuing until the scanned beam exits from said cavity beyond the rim of one of said mirrors.

6. A scanning device comprising two mirrors forming an optical cavity having a central axis, said mirrors being L units apart,
   means for entering a light beam into said cavity through an aperture on a mirror on said central axis,
   electro-optical deflecting means adjacent to each other and on opposite sides of the center of such optical cavity,
   means for continuously applying alternating voltages to said electro-optical deflecting means so as to cause scanning of said light beam, said scanned light beam being reflected by each mirror in said cavity towards said deflecting means so as to be further deflected by said deflecting means,
   the frequency of said alternating voltages being equal to $C/2L$ where C is the velocity of light, so that voltage reversals at an electro-optical deflecting means occur in synchronism with the time delay between successive passes of said light beam through said electro-optical deflecting means.

7. The scanning device of claim 6 wherein said alternating voltages applied to said electro-optical deflecting means are orthogonal to each other.

References Cited

UNITED STATES PATENTS

| | | | |
|---|---|---|---|
| 2,836,652 | 5/1958 | Sprague | 178—7.6 X |
| 3,040,625 | 6/1962 | Zito | 178—7.6 X |
| 3,258,717 | 6/1966 | Katzman | 331—94.5 |
| 3,297,876 | 1/1967 | DeMaria | 331—94.5 X |
| 3,304,428 | 2/1967 | Peters | 350—150 |
| 3,305,292 | 2/1967 | Miller | 350—150 |
| 3,357,771 | 12/1967 | Buhrer et al. | 350—150 X |

DAVID SCHONBERG, *Primary Examiner.*

PAUL R. MILLER, *Assistant Examiner.*

U.S. Cl. X.R.

350—160